US012803412B2

(12) United States Patent
Mukherjee et al.

(10) Patent No.: US 12,803,412 B2
(45) Date of Patent: Nov. 17, 2026

(54) AC-DC CONVERTER CIRCUIT WITH SELECTABLE DC OUTPUT VOLTAGES

(71) Applicant: ROLLS-ROYCE plc, London (GB)

(72) Inventors: Suvajit Mukherjee, Singapore (SG); Archisman Datta, Lund (SE); Aritra Basu, Singapore (SG)

(73) Assignee: ROLLS-ROYCE plc, London (GB)

( * ) Notice: Subject to any disclaimer, the term of this patent is extended or adjusted under 35 U.S.C. 154(b) by 170 days.

(21) Appl. No.: 18/756,898

(22) Filed: Jun. 27, 2024

(65) Prior Publication Data

US 2025/0030329 A1 Jan. 23, 2025

(30) Foreign Application Priority Data

Jul. 17, 2023 (GB) ..................................... 2310911

(51) Int. Cl.

| | |
|---|---|
| ***H02M 1/00*** | (2007.01) |
| ***H02M 7/06*** | (2006.01) |
| ***H02M 7/217*** | (2006.01) |
| ***H02M 7/219*** | (2006.01) |

(52) U.S. Cl.

CPC ....... *H02M 1/0048* (2021.05); *H02M 1/0077* (2021.05); *H02M 7/06* (2013.01); *H02M 7/217* (2013.01); *H02M 7/219* (2013.01)

(58) Field of Classification Search

CPC .... H02M 1/0048; H02M 1/0077; H02M 7/06; H02M 7/217; H02M 7/219

See application file for complete search history.

(56) References Cited

U.S. PATENT DOCUMENTS

| | | | | |
|---|---|---|---|---|
| 3,654,537 A * | 4/1972 | Coffey | .................... | H02M 3/07 363/8 |
| 5,398,182 A | 3/1995 | Crosby | | |
| 5,461,297 A * | 10/1995 | Crawford | ................ | H02M 7/10 363/67 |
| 10,079,554 B2 * | 9/2018 | Tremblay | ............. | H03K 17/687 |
| 11,121,638 B2 * | 9/2021 | Joyce | ...................... | H02M 1/32 |

(Continued)

FOREIGN PATENT DOCUMENTS

| | | |
|---|---|---|
| CN | 110022075 B | 1/2020 |
| GB | 2578813 A | 5/2020 |

OTHER PUBLICATIONS

Touaiti et al., "Control Scheme of Stand-alone Doubly Fed Induction Generator for DC Voltage Applications," The 9th International Renewable Energy Congress (IREC 2018), 2018.

(Continued)

*Primary Examiner* — Lakaisha Jackson

(74) *Attorney, Agent, or Firm* — Oliff PLC

(57) ABSTRACT

AC-DC converter circuits which may include: first and second rectifier circuits each having a plurality of input connections for connection to respective first and second sets of windings of a generator, each input connection connected between a pair of series-connected rectifier diodes connected between first and second output terminals, an output capacitor connected between the first and second output terminals; a first output diode connected between the second output terminals of the first and second rectifier circuits; and a first output switch connected between the second output terminal of the first rectifier circuit and the first output terminal of the second rectifier circuit.

14 Claims, 8 Drawing Sheets

(56) References Cited

U.S. PATENT DOCUMENTS

| | | | | |
|---|---|---|---|---|
| 2015/0035395 | A1 | 2/2015 | Trainer et al. | |
| 2021/0188106 | A1* | 6/2021 | Asa | B60L 53/122 |
| 2022/0247182 | A1* | 8/2022 | Anghel | H02P 9/02 |
| 2023/0126186 | A1* | 4/2023 | Anghel | H02M 1/0032 322/28 |

OTHER PUBLICATIONS

Aizza et al., "Coordinated speed and voltage regulation of a DC Power generation system based on a woundfield split-phase generator supplying multiple rectifiers," 6th IET International Conference on Power Electronics, Machines and Drives (PEMD 2012), 2012.

Smai et al., "Marine Current Energy Conversion System driven DFIG connected to dc-bus," 2021 18th International Multi-Conference on Systems, Signals & Devices (SSD'21), 2021, pp. 557-562.

Sulligoi et al., "Modeling, Simulation, and Experimental Validation of a Generation System for Medium-Voltage DC Integrated Power Systems," IEEE Transactions on Industry Applications, 2010, vol. 46, No. 4, pp. 1304-1310.

Tessarolo, A., "Analysis of Split-Phase Electric Machines with Unequally-Loaded Stator Windings and Distorted Phase Currents," XIX International Conference on Electrical Machines—ICEM 2010, Rome, 2010.

Jan. 18, 2024 Search Report issued in British Patent Application No. 2310911.9.

* cited by examiner

AC-DC CONVERTER CIRCUIT WITH SELECTABLE DC OUTPUT VOLTAGES

This specification is based upon and claims the benefit of priority from UK Patent Application Number 2310911.9 filed on 17 Jul. 2023, the entire contents of which are incorporated herein by reference.

BACKGROUND

Technical Field of the Disclosure

The disclosure relates to AC-DC converter circuits for converting AC electrical power from a generator to DC output power.

Background of the Disclosure

AC-DC converter circuits can be used for high power applications, for example to convert an AC supply from an electrical machine to a DC supply on a DC bus, and vice versa. An AC-DC converter circuit may be configured to supply a DC output voltage based on a set arrangement of rectifier diodes or may incorporate active switches, for example based on high power MOSFETs, to provide a controlled output voltage and to allow for conversion from DC to AC as well as from AC to DC. A limitation of existing converter circuits is the ability to provide a wide range of DC output voltages, which may require many active components and therefore result in lower efficiency and higher cost.

SUMMARY OF THE DISCLOSURE

According to a first aspect there is provided an AC-DC converter circuit comprising:

first and second rectifier circuits each having a plurality of input connections for connection to respective first and second sets of windings of a generator, each input connection connected between a pair of series-connected rectifier diodes connected between first and second output terminals, an output capacitor connected between the first and second output terminals;

a first output diode connected between the second output terminals of the first and second rectifier circuits; and a first output switch connected between the second output terminal of the first rectifier circuit and the first output terminal of the second rectifier circuit.

The AC-DC converter circuit may further comprise:

a third rectifier circuit having a plurality of input connections for connection to a third set of windings of the generator, each input connection connected between a pair of series-connected rectifier diodes connected between first and second output terminals, an output capacitor connected between the first and second output terminals;

a second output diode connected between the second output terminals of the second and third rectifier circuits; and a second output switch connected between the second output terminal of the second rectifier circuit and the first output terminal of the third rectifier circuit.

A transistor may be connected in parallel across each of the rectifier diodes of the third rectifier circuit.

The AC-DC converter circuit may comprise:

a first converter DC terminal connected to the second terminal of the third rectifier circuit; and a second converter DC terminal connected to the first output terminal of the first rectifier circuit.

The AC-DC converter circuit may further comprise a controller configured to operate the first and second output switches to:

provide a first output DC supply across the first and second converter DC terminals from the first rectifier circuit when the first and second output switches are open;

provide a second output DC supply across the first and second converter DC terminals from the first and third rectifier circuits when the first output switch is open and the second output switch is closed;

provide a third output DC supply across the first and second converter DC terminals from the first and second rectifier circuits when the first output switch is closed and the second output switch is open; and provide a fourth output DC supply across the first and second converter DC terminals from the first, second and third rectifier circuits when the first and second output switches are closed.

The controller may be configured to operate the transistors of the third rectifier circuit according to a switching sequence to provide a controlled output DC supply when the second output switch is closed.

The AC-DC converter circuit may further comprise:

a first converter DC terminal;

a second converter DC terminal;

a third output diode connected between the first output terminal of the third rectifier circuit and the first converter DC terminal; and a third output switch connected between the first converter DC terminal and the second output terminal of the third rectifier circuit.

The second converter DC terminal may be connected to the first output terminal of the first rectifier circuit.

The AC-DC converter circuit may further comprise:

a fourth output diode connected between the second output terminal of the first rectifier circuit and the second converter DC terminal; and a fourth output switch connected between the second converter DC terminal and the first output terminal of the first rectifier circuit.

According to a second aspect there is provided a DC power generator system comprising:

a generator comprising a plurality of sets of windings; and an AC-DC converter circuit according to the first aspect, wherein each of the plurality of sets of windings is connected to a corresponding plurality of input connections of a respective one of the rectifier circuits.

According to a third aspect there is provided an aircraft propulsion system comprising:

the DC power generator system of the second aspect; and a DC bus connected to first and second converter DC terminals of the AC-DC converter circuit.

The aircraft propulsion system may comprise:

a battery pack; and a DC-DC electric power converter connected between the battery pack and the DC bus.

The aircraft propulsion system may comprise a gas turbine engine connected to the generator.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION OF THE DISCLOSURE

The circuit topology described herein can be used to obtain a high range of DC output voltages without using a high number of active devices. Multiple (passive and active) rectifiers are fed from different windings of a multi-winding electrical machine. The rectifiers are cascaded together to provide the output DC voltage. Some additional switches are provided to operate in certain combinations to yield the reference DC output voltage. These additional switches add only a small conduction loss and no switching losses. Therefore, the additional switches can be chosen appropriately to maximize overall efficiency of the circuit.

Figure 1:
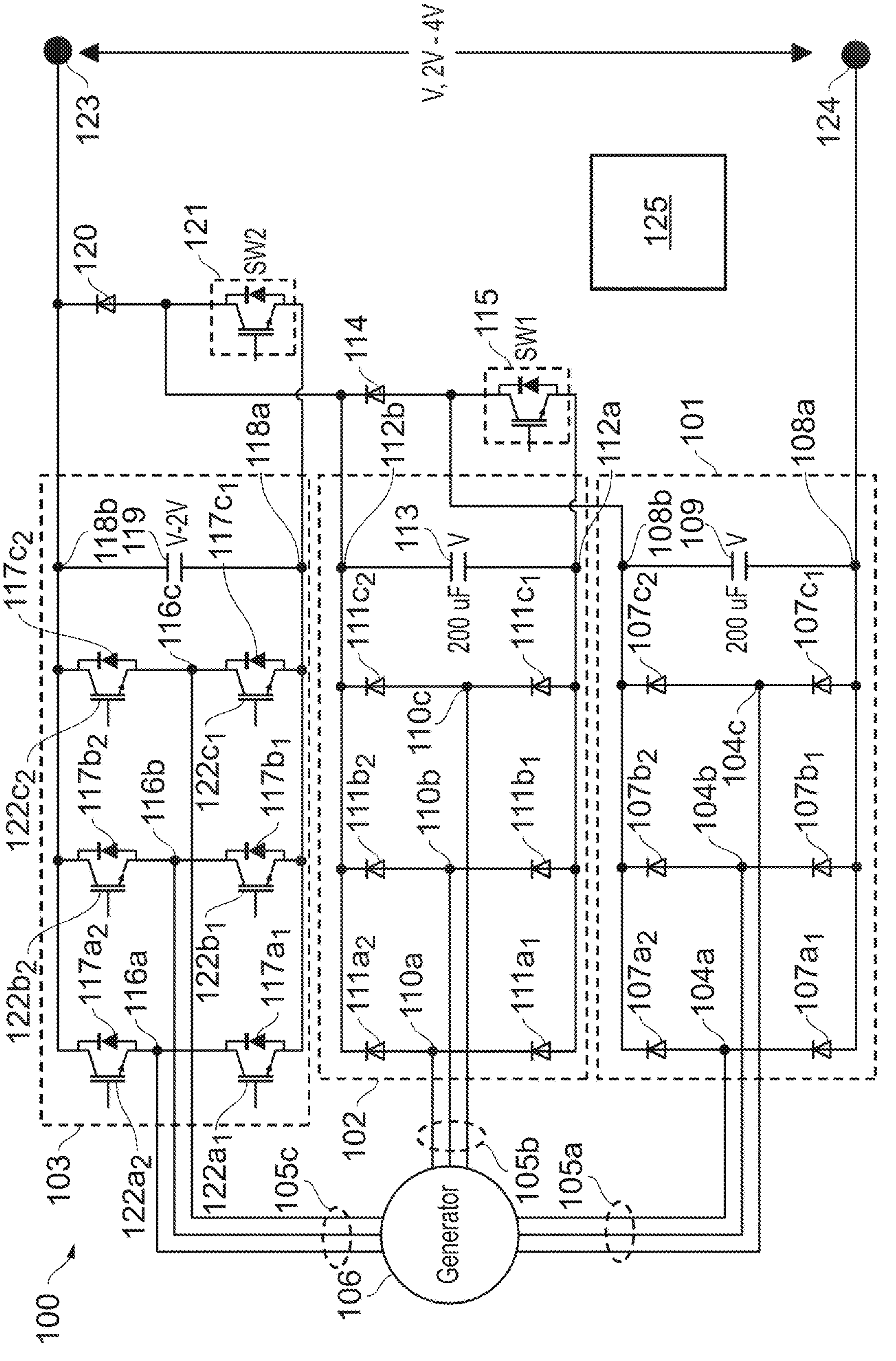
FIG. 1 is a schematic circuit diagram of an example AC-DC converter circuit.

Various circuit topology configurations are possible, some examples of which are illustrated and described herein. FIG. 1 illustrates a first configuration, FIG. 4 a second configuration, and FIG. 6 a third configuration. These differ in having different output connections and switches, which enables different levels of control over the total output voltage, as described in further detail below.

Voltage outputs from each of the circuits described herein may be considered to be within four different zones, zone 1 being an output between 0 and V, zone 2 being an output between V and 2V, zone 3 being an output between 3V and 4V, and zone 4 being an output between 3V and 4V. Each of the circuits described below is capable of being operated in a different number of zones.

FIG. 1

FIG. 1 illustrates an AC-DC converter circuit 100 having first, second and third rectifier circuits 101, 102, 103. Each of the rectifier circuits 101, 102, 103 comprises a plurality of input connections 104*a-c*, 110*a-c*, 116*a-c*, which are connected to respective sets of windings 105*a*, 105*b*, 105*c* of an electrical generator 106.

In the first rectifier circuit 101, each of the input connections 104*a-c* is connected between a respective pair of series-connected rectifier diodes $\mathbf{107}a_1$, $\mathbf{107}a_2$, $\mathbf{107}b_1$, $\mathbf{107}b_2$, $\mathbf{107}c_1$, $\mathbf{107}c_2$, which are connected between first and second output terminals 108*a*, 108*b*. An anode of a first one $\mathbf{107}a_1$, $\mathbf{107}b_1$, $\mathbf{107}c_1$ of each pair of diodes is connected to the first output terminal 108*a*. A cathode of a second one $\mathbf{107}a_2$, $\mathbf{107}b_2$, $\mathbf{107}c_2$ of each pair of diodes is connected to the second output terminal 108*b*. A first output capacitor 109 is connected between the first and second output terminals 108*a*, 108*b* of the first rectifier circuit 101.

In the second rectifier circuit 102, each of the input connections 110*a-c* is also connected between a respective pair of series-connected rectifier diodes $\mathbf{111}a_1$, $\mathbf{111}a_2$, $\mathbf{111}b_1$, $\mathbf{111}b_2$, $\mathbf{111}c_1$, $\mathbf{111}c_2$, which are connected between first and second output terminals 112*a*, 112*b*. An anode of a first one $\mathbf{111}a_1$, $\mathbf{111}b_1$, $\mathbf{111}c_1$ of each pair of diodes is connected to the first output terminal 112*a*. A cathode of a second one $\mathbf{111}a_2$, $\mathbf{111}b_2$, $\mathbf{111}c_2$ of each pair of diodes is connected to the second output terminal 112*b*. A second output capacitor 113 is connected between the first and second output terminals 112*a*, 112*b* of the second rectifier circuit 102.

In the third rectifier circuit 103, each of the input connections 116*a-c* is also connected between a respective pair of series-connected rectifier diodes $\mathbf{117}a_1$, $\mathbf{117}a_2$, $\mathbf{117}b_1$, $\mathbf{117}b_2$, $\mathbf{117}c_1$, $\mathbf{117}c_2$, which are connected between first and second output terminals 118*a*, 118*b*. An anode of a first one $\mathbf{117}a_1$, $\mathbf{117}b_1$, $\mathbf{117}c_1$ of each pair of diodes is connected to the first output terminal 118*a*. A cathode of a second one $\mathbf{117}a_2$, $\mathbf{117}b_2$, $\mathbf{117}c_2$ of each pair of diodes is connected to the second output terminal 118*b*. A third output capacitor 119 is connected between the first and second output terminals 118*a*, 118*b* of the third rectifier circuit 103.

Although three rectifier circuits 101, 102, 103 are illustrated in the AC-DC converter circuit 100 of FIG. 1, some of the benefits may be obtained by using only two of the rectifier circuits, for example using first and second rectifier circuits 101, 102 with generator 106 having two sets of windings. In other examples, more than three rectifier circuits with a corresponding number of windings may be envisaged.

A first output diode 114 is connected between the second output terminal 112*b* of the second rectifier circuit 102 and the second output terminal 108*b* of the first rectifier circuit 101. A cathode terminal of the first output diode 114 is connected to the second output terminal 112*b* of the second rectifier circuit 102 and an anode terminal is connected to the second output terminal 108*b* of the first rectifier circuit 101.

A first output switch SW1 115 is connected between the second output terminal 108*b* of the first rectifier circuit 101 and the first output terminal 112*a* of the second rectifier circuit 102. Operation of the first output switch 115 allows the second rectifier circuit 102 to be selectively operated, depending on whether the first output switch 115 is open or closed.

A second output diode 120 is connected between the second output terminal 118*b* of the third rectifier circuit 103 and the second output terminal 112*b* of the second rectifier circuit 102. A cathode terminal of the second output diode 120 is connected to the second output terminal 118*b* of the third rectifier circuit 103 and an anode terminal is connected to the second output terminal 112*b* of the second rectifier circuit 102.

A second output switch SW2 121 is connected between the second output terminal 112*b* of the second rectifier circuit 102 and the first output terminal 118*a* of the third rectifier circuit 103. Operation of the second output switch 121 allows the third rectifier circuit 103 to be selectively operated, depending on whether the second output switch 121 is open or closed.

Each of the first and second switches 115, 121 comprises a transistor in parallel with a diode, the diode in each case having an anode terminal connected to the first output terminal 112*a*, 118*a* of the respective second and third rectifier circuits 102, 103. The transistor of each of the first and second switches 115, 121 may for example be a bipolar junction transistor (BJT) or a MOSFET.

One of the rectifier circuits 101-103 comprises transistors connected in parallel across each of the rectifier diodes of the rectifier circuit. In the example illustrated in FIG. 1, the third rectifier circuit comprises a transistor 122$a_1,a_2,b_1,b_2,c_1,c_2$ connected in parallel across each of the rectifier diodes 117$a_1,a_2,b_1,b_2,c_1,c_2$. The transistors 122$a_1,a_2,b_1,b_2,c_1,c_2$ enable the rectifier circuit 103 to be operated by a controller 125 to provide an adjustable DC output voltage across the output terminals 118*a*, 118*b* of the third rectifier circuit 103.

In the example circuit of FIG. 1, a first converter DC terminal 123 is connected to the second terminal 118*b* of the third rectifier circuit 103 and a second converter DC terminal 124 is connected to the first output terminal 108*a* of the first rectifier circuit 101.

Operation of the output switches 115, 121 allows the converter circuit 100 of FIG. 1 to be operated in four different states, summarised in Table 1 below.

In a first state, with switches SW1 115 and SW2 121 both open, the output voltage between the first and second converter DC terminals 123, 124 is uncontrolled and provides an output voltage V given by the voltage across the first and second output terminals 108*a*, 108*b* of the first rectifier circuit 101.

In a second state, with switch SW2 121 closed and SW1 115 open, the output voltage between the first and second converter DC terminals 123, 124 can be varied between 2V and 3V by varying the switching signals provided to the transistors 122$a_1,a_2,b_1,b_2,c_1,c_2$ of the third rectifier circuit 103 to vary the output voltage between the first and second output terminals 118*a*, 118*b* of the third rectifier circuit between V and 2V in combination with the set voltage V from the first rectifier circuit 101.

In a third state, with switch SW2 121 open and SW1 closed, the output voltage between the first and second converter DC terminals 123, 124 is uncontrolled, and is set to 2V, i.e. a combination of the set output voltages from the first and second rectifier circuits 101, 102.

In a fourth state, with both switches SW1 115 and SW2 121 closed, the output voltage between the first and second converter DC terminals 123, 124 is controllable between 3V and 4V by controlling switching signals provided to the transistors 122$a_1,a_2,b_1,b_2,c_1,c_2$ of the third rectifier circuit 103.

The output power in each state corresponds to the output voltage, i.e. when the output voltage is V the output power is P and when the output voltage is 2V the output power is 2P.

In a general aspect, the controller 125 is configured to operate the first and second output switches 115, 121 to provide an output DC supply across the first and second converter DC terminals 123, 124 from one or more of the first, second and third rectifier circuits 101, 102, 103. A first output DC supply across the first and second converter DC terminals 123, 124 is provided from the first rectifier circuit 101 when the first and second output switches 115, 121 are open. A second output DC supply across the first and second converter DC terminals 123, 124 from the first and third rectifier circuits 101, 103 is provided when the first output switch 115 is open and the second output switch 121 is closed. A third output DC supply across the first and second converter DC terminals 123, 124 is provided from the first and second rectifier circuits 101, 102 when the first output switch 115 is closed and the second output switch 121 is open. A fourth output DC supply across the first and second converter DC terminals 123, 124 is provided from the first, second and third rectifier circuits 101, 102, 103 when the first and second output switches 115, 121 are closed.

The controller 125 is further configured to operate the transistors 122$a_1,a_2,b_1,b_2,c_1,c_2$ of the third rectifier circuit 103 according to a switching sequence to provide a controlled output DC supply when the second output switch 121 is closed.

TABLE 1

Output voltages and powers for the AC-DC converter of FIG. 1

| State | Switching States | | | Output | Output |
|---|---|---|---|---|---|
| No. | SW2 | SW1 | Mode | Voltage | Power |
| 1 | 0 | 0 | Uncontrolled voltage | V | P |
| 2 | 1 | 0 | Zone-3 | 2 V-3 V | 2P-3P |
| 3 | 0 | 1 | Uncontrolled voltage | 2 V | 2P |
| 4 | 1 | 1 | Zone-4 | 3 V-4 V | 3P-4P |

An advantage of the AC-DC converter circuit 100 of FIG. 1 is that a combination of fixed and variable DC output voltages and corresponding powers is available by switching in and out the second and/or third rectifier circuits 102, 103.

FIGS. 2 & 3

Figure 2:
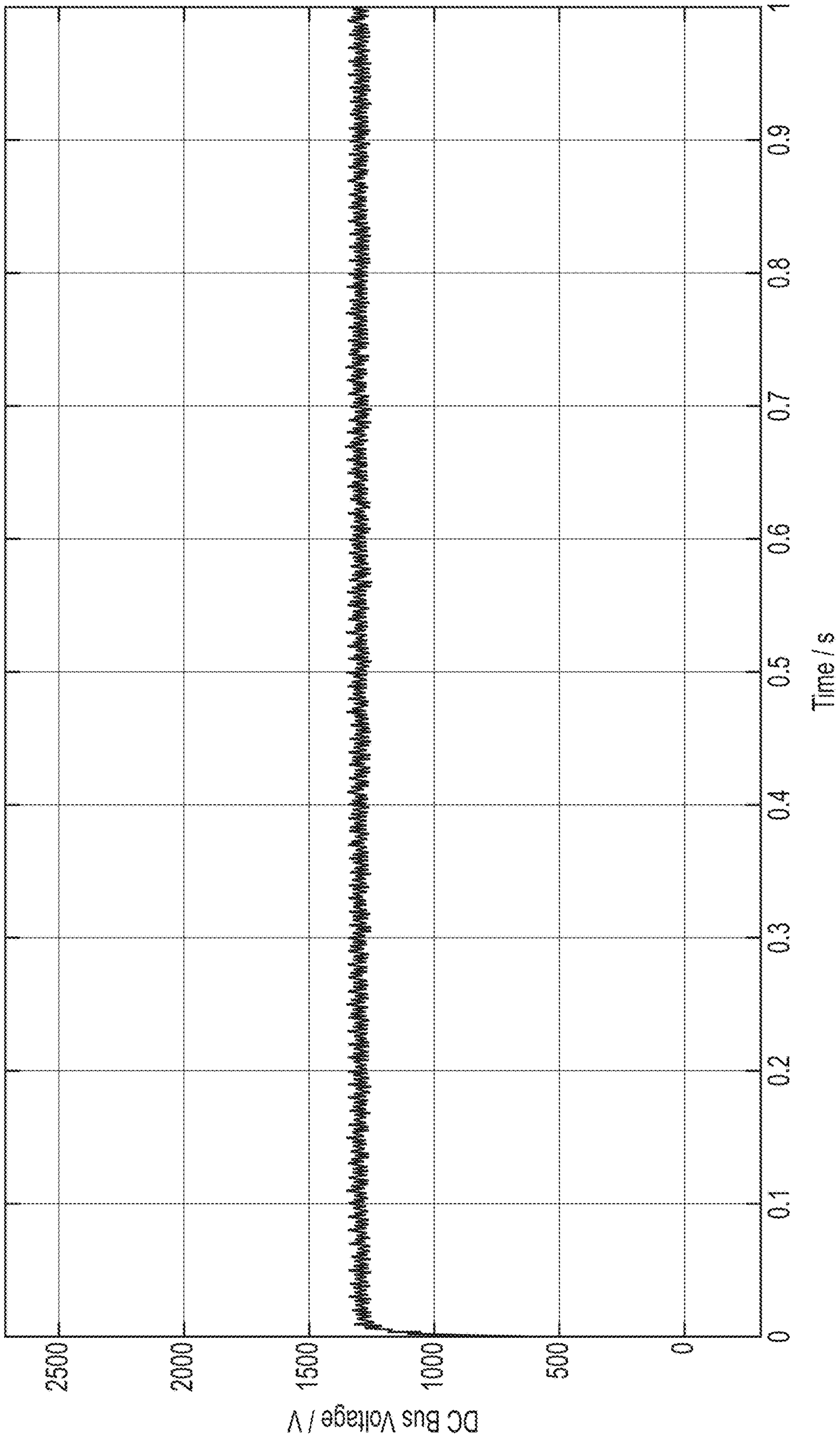
FIG. 2 is a plot of DC bus output voltage at zone-3 as a function of time for the converter circuit of FIG. 1.
Figure 3:
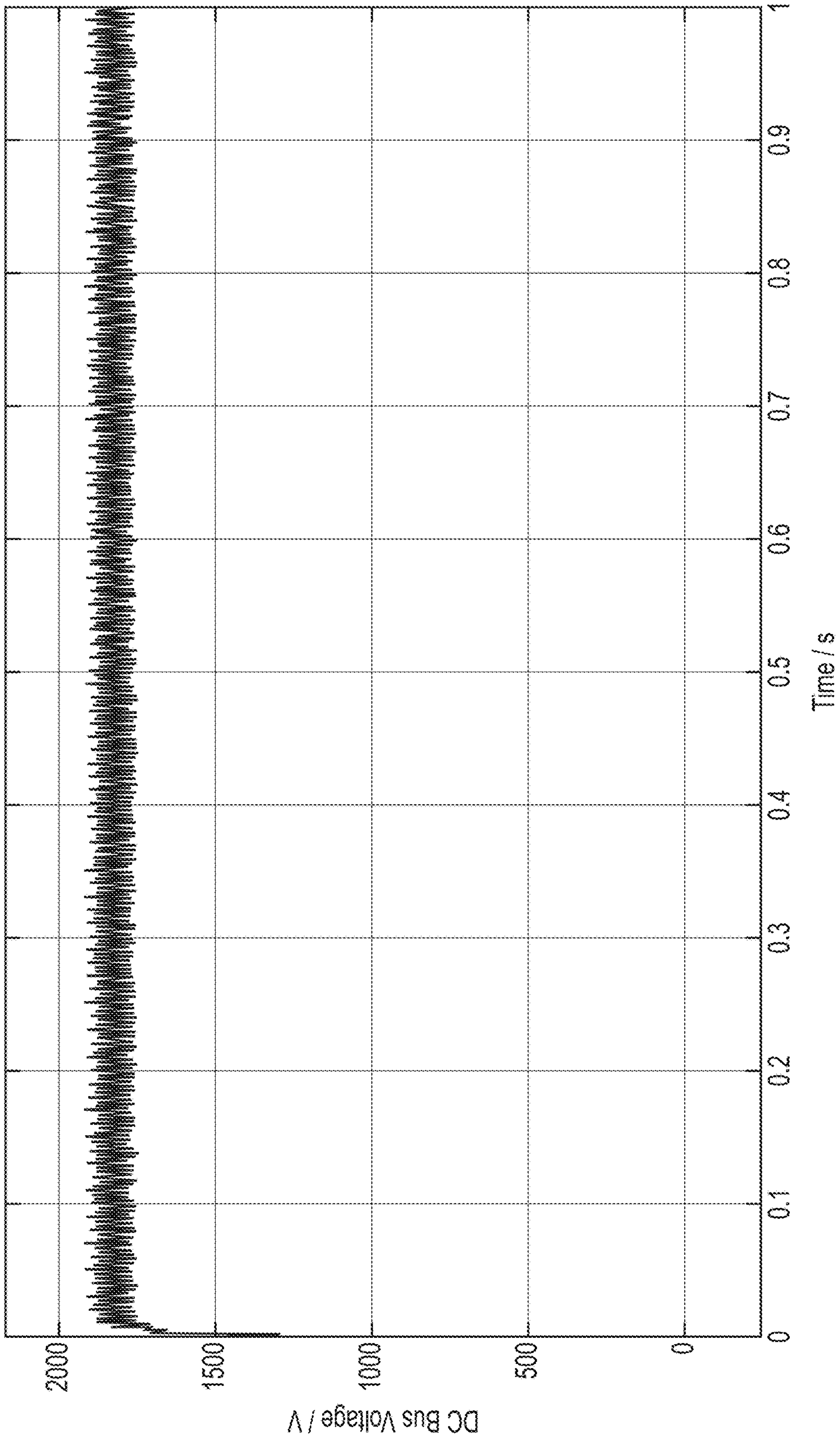
FIG. 3 is a plot of DC bus output voltage at zone-4 as a function of time for the converter circuit of FIG. 1.

FIG. 2 is an example plot of an output DC voltage over time for the converter circuit 100 of FIG. 1 operating in zone-3, i.e. with the switching state number 2 indicated in Table 1. FIG. 3 is an example plot of an output DC voltage over time for the converter circuit 100 of FIG. 1 operating in zone-4, i.e. with the switching state number 4 indicated in Table 1.

FIG. 4

Figure 4:
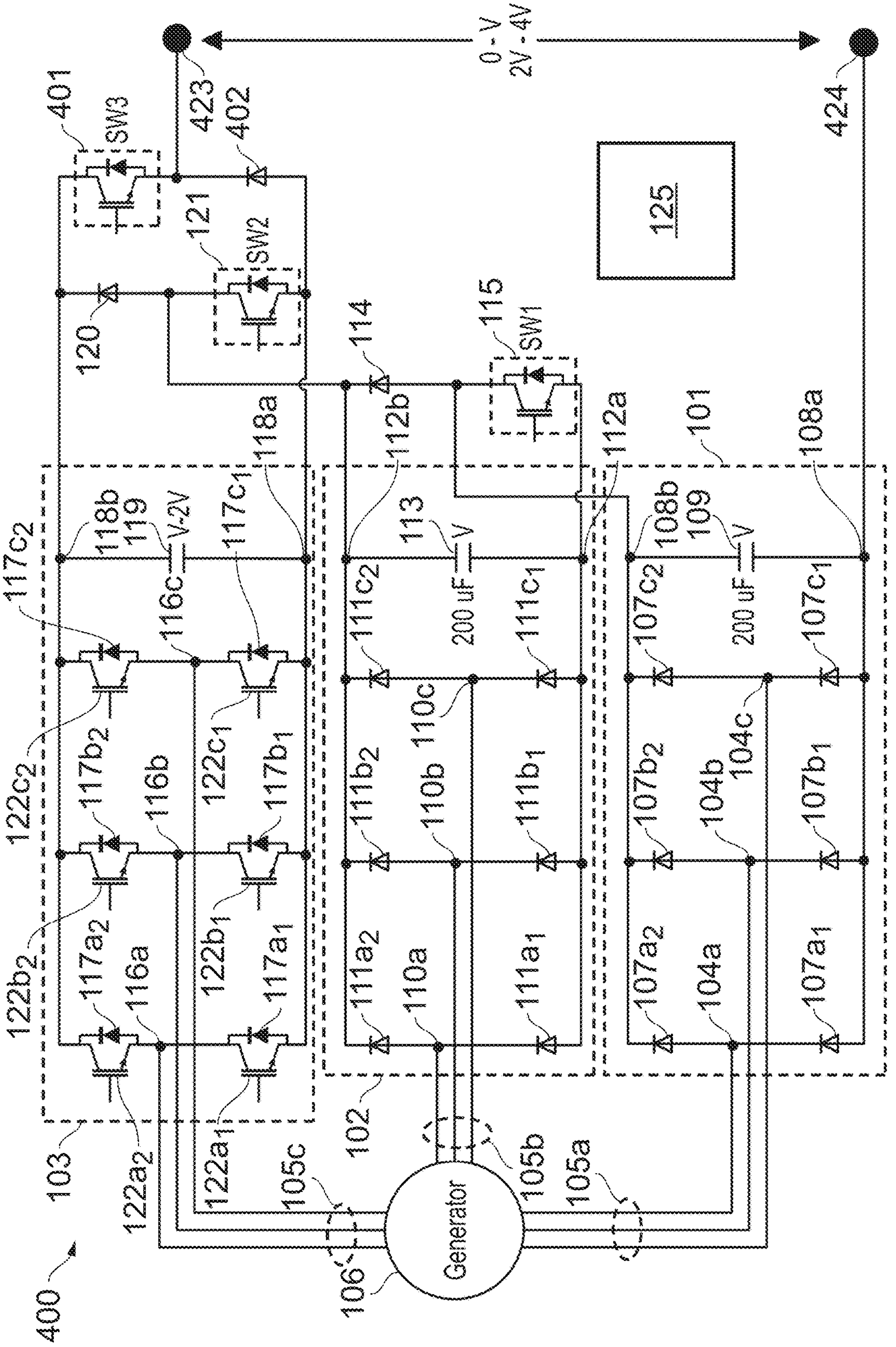
FIG. 4 is a schematic circuit diagram of a further example AC-DC converter circuit.

In a second configuration, illustrated in FIG. 4, the AC-DC converter circuit 400 comprises an additional third output diode 402 with an anode terminal connected to the first output terminal 118*a* of the third rectifier circuit 103 and a cathode terminal connected to a first converter DC terminal 423. A third output switch SW3 401 is connected between the first converter DC terminal 423 and the second output terminal 118*b* of the third rectifier circuit 103. The second converter DC terminal 424 is connected to the first output terminal 108*a* of the first rectifier circuit 101. Other components of the converter circuit 400 are similar to those of the converter circuit 100 described above in relation to FIG. 1, with corresponding reference signs.

The additional switch SW3 401 and diode 402 enables the converter circuit 400 to be operated in one of five different states, summarised in Table 2 below. In zones 1, 3 and 4, corresponding to switching states 3, 4 and 5, the output voltage is variable between 0 and V, 2V and 3V and between 3V and 4V. This provides further flexibility, enabling the output voltage to be varied over a wider range compared with the circuit of FIG. 1.

TABLE 2

Output voltages and powers for the AC-DC converter of FIG. 4.

| State | Switching States | | | | Output | Output |
|---|---|---|---|---|---|---|
| No. | SW2 | SW3 | SW1 | Mode | Voltage | Power |
| 1 | 0<br>1 | 1<br>0 | 0 | Uncontrolled voltage | V | P |
| 2 | 0<br>1 | 1<br>0 | 1 | Uncontrolled voltage | 2 V | 2 P |

TABLE 2-continued

Output voltages and powers for the AC-DC converter of FIG. 4.

| State No. | Switching States SW2 | SW3 | SW1 | Mode | Output Voltage | Output Power |
|---|---|---|---|---|---|---|
| 3 | 0 | 0 | 1 | Zone-1 | 0-V | 0-P |
| 4 | 1 | 1 | 0 | Zone-3 | 2 V-3 V | 2 P-3 P |
| 5 | 1 | 1 | 1 | Zone-4 | 3 V-4 V | 3 P-4 P |

FIG. 5

Figure 5:
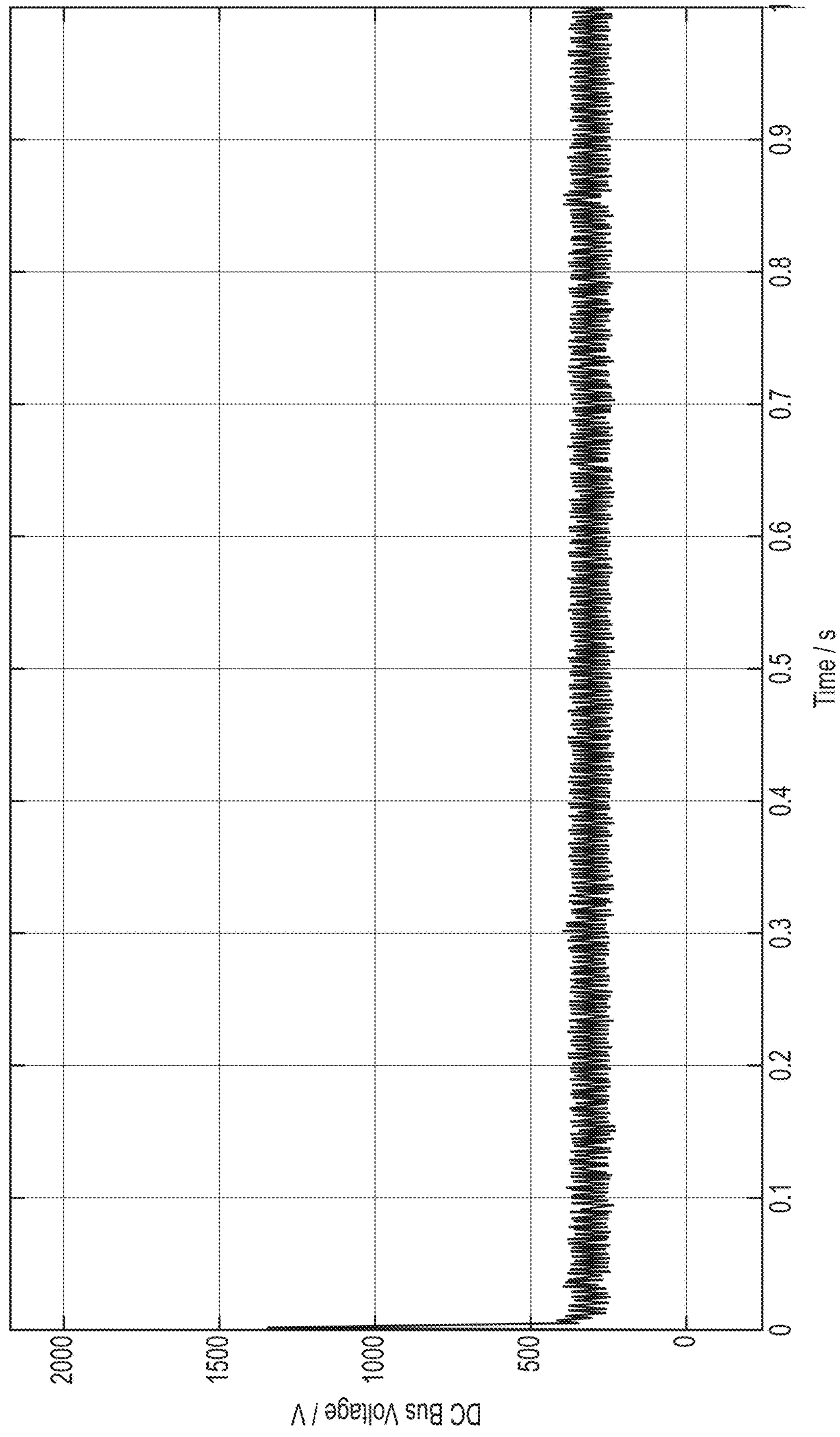
FIG. 5 is a plot of DC bus output voltage at zone-1 as a function of time for the converter circuit of FIG. 4.

FIG. 5 illustrates a plot of DC bus voltage for the AC-DC converter circuit 400 of FIG. 4 operating in zone 1, i.e. where the output voltage is between 0 and V.

FIG. 6

Figure 6:
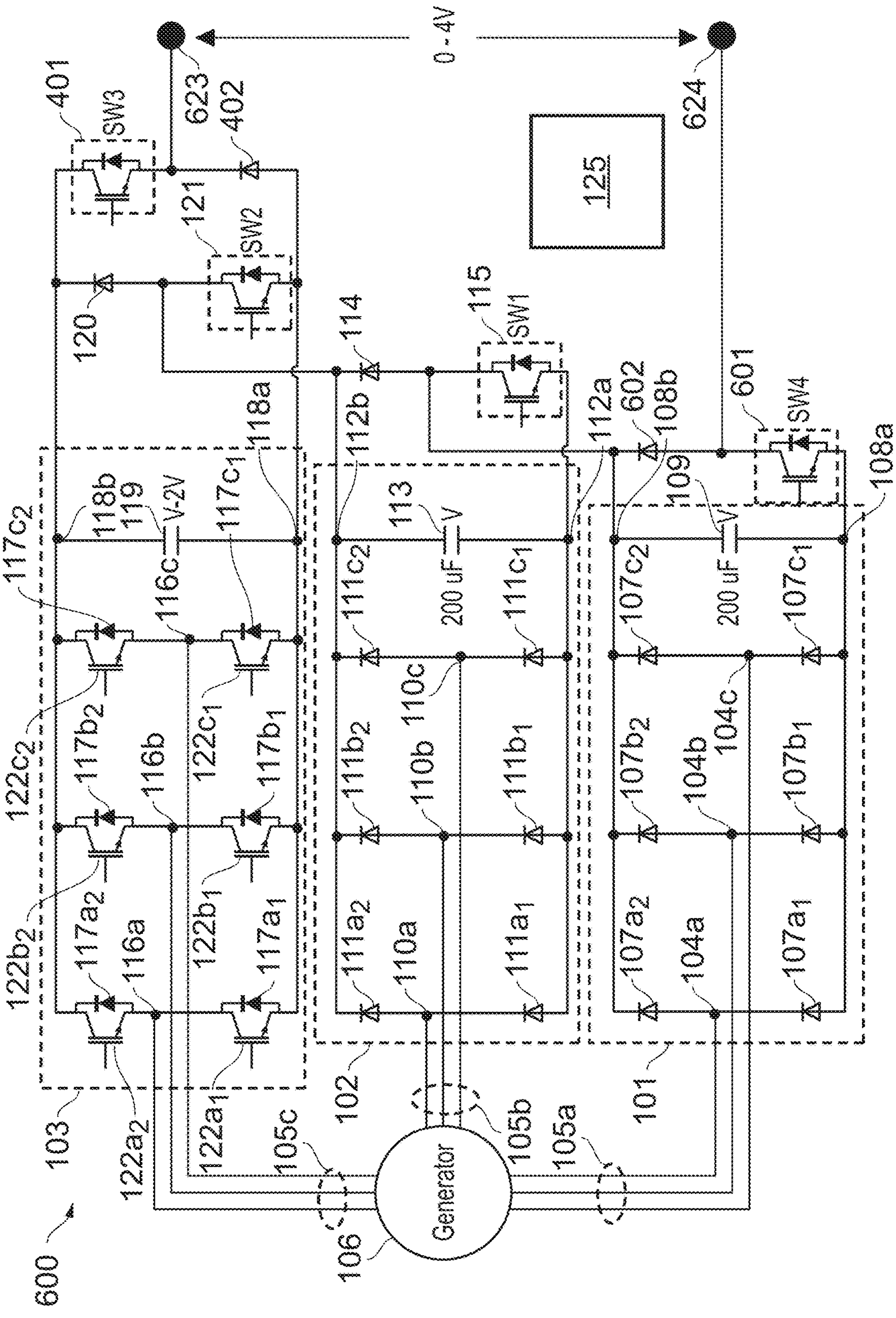
FIG. 6 is a schematic circuit diagram of a further example AC-DC converter circuit.

In a third configuration, illustrated in FIG. 6, the AC-DC converter circuit 600 comprises an additional fourth output diode 602 connected between the second output terminal 108*b* of the first rectifier circuit 101 and the second converter DC terminal 624. An anode terminal of the fourth output diode 602 is connected to the second converter DC terminal 624 and a cathode terminal connected to the second output terminal 108*b* of the first rectifier circuit 101. A fourth output switch 601 is connected between the second converter DC terminal 624 and the first output terminal 108*a* of the first rectifier circuit 103.

The addition of the fourth output diode 602 and fourth output switch 601 enables the AC-DC converter circuit 600 to operate in all of zones 1-4, enabling control of the output DC voltage from 0 up to 4V, where V is the uncontrolled output voltage of one of the rectifier circuits 101-103. A summary of the possible switching states of each of the four switches SW1-4 115, 121, 401, 601 and the corresponding output voltage and power is provided in Table 3 below.

TABLE 3

Output voltages and powers for the AC-DC converter of FIG. 6.

| State No. | Switching States SW2 | SW3 | SW1 | SW4 | Mode | Output Voltage | Output Power |
|---|---|---|---|---|---|---|---|
| 1 | 0<br>1 | 1<br>0 | 1 | 0 | Uncontrolled voltage | V | P |
| | 0<br>1 | 1<br>0 | 0 | 1 | Uncontrolled voltage | | |
| 2 | 1<br>0 | 0<br>1 | 1 | 1 | Uncontrolled voltage | 2 V | 2 P |
| 3 | 0 | 0 | 1 | 1 | Zone-1 | 0-V | 0-P |
| 4 | 1 | 1 | 0 | 0 | Zone-2 | V-2 V | P-2 P |
| 5 | 1 | 1 | 1<br>0 | 0<br>1 | Zone-3 | 2 V-3 V | 2 P-3 P |
| 6 | 1 | 1 | 1 | 1 | Zone-4 | 3 V-4 V | 3 P-4 P |

FIG. 7

Figure 7:
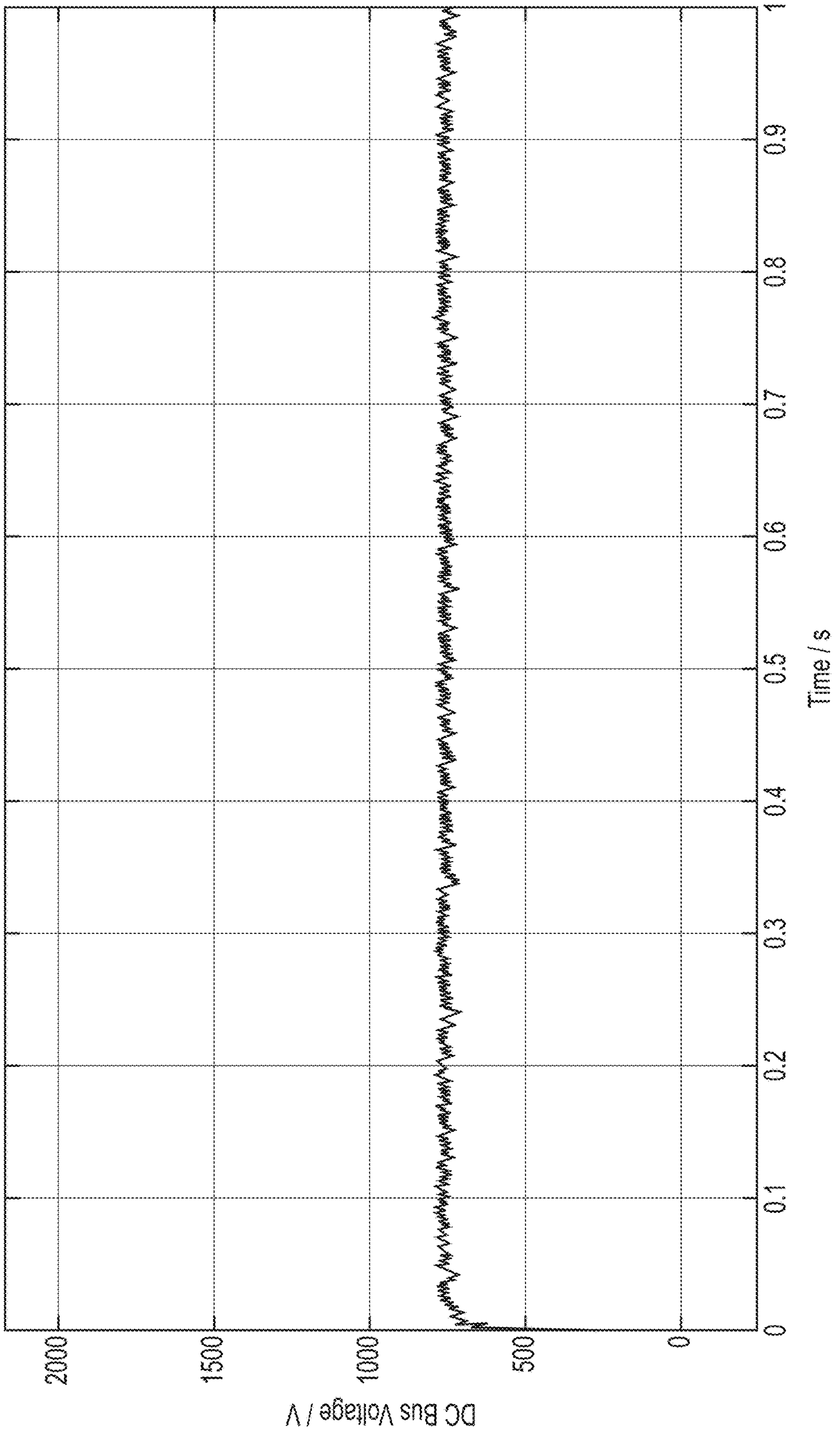
FIG. 7 is a plot of DC bus output voltage at zone-2 as a function of time for the converter circuit of FIG. 6.

FIG. 7 illustrates a plot of DC bus voltage for the AC-DC converter circuit 500 of FIG. 6 operating in zone 2, i.e. where the output voltage is between V and 2V.

Table 4 below summarises the first, second and third configurations, corresponding to the circuits in FIGS. 1, 4 and 6 respectively, the corresponding number of switches and the number of zones available. In each case, the number of switches subject to switching and conduction losses is six, corresponding to the number of switches in one of the rectifier circuits, while the number of switches subject only to conduction losses is two for the first configuration, three for the second configuration and four for the third configuration.

TABLE 4

Summary of number of output switches and available zones.

| Config. No. | No. of Switches: with switching + conduction loss | with conduction loss only | Total | Zones |
|---|---|---|---|---|
| 1 | 6 | 2 | 8 | Zone 3, Zone 4 |
| 2 | 6 | 3 | 9 | Zone 1, Zone 3, Zone 4 |
| 3 | 6 | 4 | 10 | Zone 1, Zone 2, Zone 3, Zone 4 |

The AC-DC converter circuits described herein may provide one or more of the following benefits and advantages.

An increase in redundancy and reliability of the converter may be obtained. If, for example, one of the rectifier circuits is faulty, a certain amount of power can still be delivered. This would otherwise not be possible in conventional cascaded systems.

An increased voltage range is possible using multiple cascaded active rectifiers without increasing the number of active devices subject to both switching and conduction losses.

No additional switchgear is required at the DC bus side. Therefore, in case of a fault, the DC bus can be isolated quickly from the generator and rectifiers. The overall system power density can thereby be increased. The additional active devices can be used as SSPCs instead of using switchgear. Each rectifier circuit can be isolated separately using the additional active devices.

The operation of turning on or turning off does not require any extra circuitry. When the DC side system is off, the generator does not need to be de-energized. Therefore, there is no waiting time to build up the DC bus voltage again and increase the power available.

The transient response is faster than that of a system where power is controlled by the speed of the machine. This reduces the system's time constant when it comes to supplying power.

The output switches are subject only to conduction loss and not switching loss. The switches can therefore be selected based on minimal conduction loss, resulting in a higher system efficiency.

High power densities, for example over 30 kW/kg, may be achieved, which makes the converter circuits be suitable for aerospace applications such as in an aircraft propulsion system.

Because the output DC bus can be regulated to a lower voltage when required, the stress on the generator can be reduced in some operating conditions, thereby improving life expectancy.

Control of the output power by controlling the DC bus voltage allows for increased flexibility in choosing the operating point, which can be used to decide the optimum operating point.

Applications of an AC-DC converter circuit as described herein may include one or more of:

Renewable energy harvesting, in which the converter circuit operates to convert an AC output from a wind turbine generator to an intermediate DC voltage, which can increase the overall capability of the system.

Marine applications, i.e. in ships and submarines, in which a turbo-generator is used to generate electricity for the vessel, the generator feeding an AC supply together with a DC bus suppy. A high voltage DC network can increase the overall system efficiency.

Aerospace converters, in which a high voltage DC bus, connected to the generator, can reduce the current flowing through ducts in an aircraft, thereby reducing the duct diameter.

FIG. 8

Figure 8:
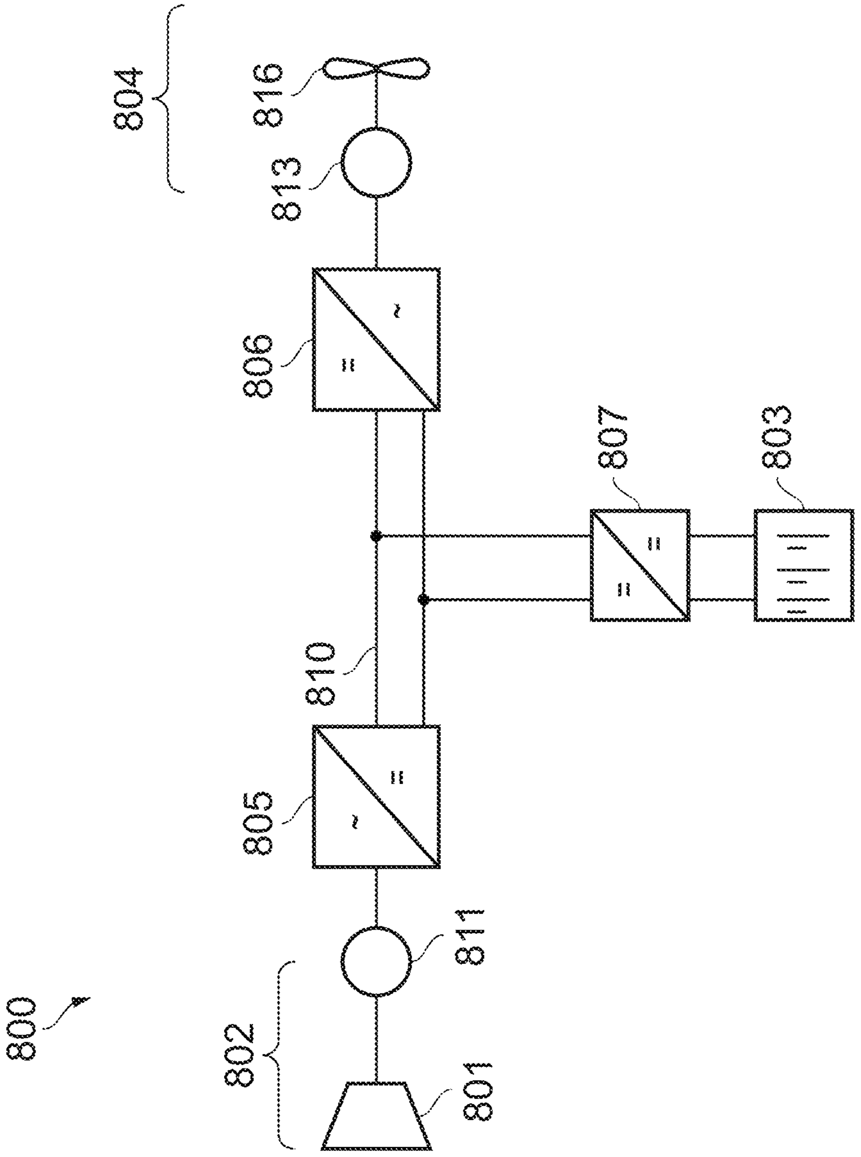
FIG. 8 is a schematic diagram of an example aircraft propulsion system.

FIG. 8 illustrates an exemplary propulsion system 800 of a hybrid electric aircraft. The propulsion system 800 includes a generator set 802 comprising a gas turbine engine 801 and electrical generator 811, and a battery pack 803. Both the generator set 802 and the battery pack 803 are used as energy sources to power a motor-driven propulsor 804.

The illustrated propulsion system 800 further comprises an AC/DC converter 805, a DC distribution bus 810, a DC/AC converter 806 and a DC/DC converter 807. It will be appreciated that whilst one generator set 802 and one propulsor 804 are illustrated in this example, a propulsion system 800 may include more than one generator set 802 and/or one or more propulsor 804.

A shaft or spool of the engine 801 is coupled to and drives the rotation of a shaft of the generator 811 which thereby produces alternating current. The AC/DC converter 805, which faces the generator 811, converts the alternating current into direct current which is fed to various electrical systems and loads via the DC distribution bus 810. These electrical systems include non-propulsive loads (not shown in FIG. 8) and the motor-driven propulsor 804, which comprises a motor 813 which drives a propellor or fan 716 via the DC/AC converter 806.

The battery pack 803, which may be made up of a number of battery modules connected in series and/or parallel, is connected to the DC distribution bus 810 via the DC/DC converter 807. The DC/DC converter 807 converts between a voltage of the battery pack 803 and a voltage of the DC distribution bus 810. In this way, the battery pack 803 can replace or supplement the power provided by the generator set 802 (by discharging and thereby feeding the DC distribution bus 810) or can be charged using the power provided by the generator set 802 (by being fed by the DC distribution bus 810).

An AC-DC converter circuit as described herein may provide the AC-DC converter 805 of the aircraft propulsion system 800 illustrated in FIG. 8. In other applications, a DC power generator system may comprise the generator 811 and AC-DC converter 805 with a similar or different power source to the gas turbine engine 801 and with or without the other components for storage of power and for driving an electrical propulsor.

Other embodiments are within the scope of the invention, which is defined by the appended claims.

We claim:

1. An AC-DC converter circuit, comprising:

first and second rectifier circuits each having a plurality of input connections for connection to respective first and second sets of windings of a generator, each input connection connected between a pair of series-connected rectifier diodes connected between first and second output terminals, an output capacitor connected between the first and second output terminals;

a first output diode connected between the second output terminals of the first and second rectifier circuits; and a first output switch connected between the second output terminal of the first rectifier circuit and the first output terminal of the second rectifier circuit, so as to selectively use the second rectifier circuit in providing a DC output from the AC-DC converter circuit, wherein, when the first output switch is open, the second rectifier circuit is not used and the DC output is provided only from the first rectifier circuit.

2. The AC-DC converter circuit of claim 1, further comprising:

a third rectifier circuit having a plurality of input connections for connection to a third set of windings of the generator, each input connection connected between a pair of series-connected rectifier diodes connected between first and second output terminals, an output capacitor connected between the first and second output terminals;

a second output diode connected between the second output terminals of the second and third rectifier circuits; and a second output switch connected between the second output terminal of the second rectifier circuit and the first output terminal of the third rectifier circuit.

3. The AC-DC converter circuit of claim 2, wherein a transistor is connected in parallel across each of the rectifier diodes of the third rectifier circuit.

4. The AC-DC converter circuit of claim 3, comprising:

a first converter DC terminal connected to the second terminal of the third rectifier circuit; and a second converter DC terminal connected to the first output terminal of the first rectifier circuit.

5. The AC-DC converter circuit of claim 4, further comprising a controller configured to operate the first and second output switches to:

provide a first output DC supply across the first and second converter DC terminals from the first rectifier circuit when the first and second output switches are open;

provide a second output DC supply across the first and second converter DC terminals from the first and third rectifier circuits when the first output switch is open and the second output switch is closed;

provide a third output DC supply across the first and second converter DC terminals from the first and second rectifier circuits when the first output switch is closed and the second output switch is open; and provide a fourth output DC supply across the first and second converter DC terminals from the first, second and third rectifier circuits when the first and second output switches are closed.

6. The AC-DC converter circuit of claim 5, wherein the controller is configured to operate the transistors of the third rectifier circuit according to a switching sequence to provide a controlled output DC supply when the second output switch is closed.

7. The AC-DC converter circuit of claim 3, further comprising:

a first converter DC terminal;

a second converter DC terminal;

a third output diode connected between the first output terminal of the third rectifier circuit and the first converter DC terminal; and a third output switch connected between the first converter DC terminal and the second output terminal of the third rectifier circuit.

8. The AC-DC converter circuit of claim 7, wherein the second converter DC terminal is connected to the first output terminal of the first rectifier circuit.

9. The AC-DC converter circuit of claim 7, further comprising:

a fourth output diode connected between the second output terminal of the first rectifier circuit and the second converter DC terminal; and a fourth output switch connected between the second converter DC terminal and the first output terminal of the first rectifier circuit.

10. A DC power generator system comprising:

the generator comprising a plurality of sets of windings including the first and second sets; and the AC-DC converter circuit according to claim 1, wherein each of the plurality of sets of windings is connected to the corresponding plurality of input connections of a respective one of the rectifier circuits.

11. An aircraft propulsion system comprising:

the DC power generator system of claim 10; and a DC bus connected to first and second converter DC terminals of the AC-DC converter circuit.

12. The aircraft propulsion system of claim 11, comprising:

a battery pack; and a DC-DC electric power converter connected between the battery pack and the DC bus.

13. The aircraft propulsion system of claim 11, comprising a gas turbine engine connected to the generator.

14. The aircraft propulsion system of claim 10, comprising a gas turbine engine connected to the generator.

* * * * *